US007007925B2

(12) United States Patent
Nordstrom et al.

(10) Patent No.: US 7,007,925 B2
(45) Date of Patent: Mar. 7, 2006

(54) ELECTROHYDRAULIC VALVE HAVING AN ARMATURE WITH A ROLLING BEARING

(75) Inventors: Robert S. Nordstrom, Wauwatosa, WI (US); Curtis L. Van Weelden, Sussex, WI (US)

(73) Assignee: HUSCO International, Inc., Waukesha, WI (US)

( * ) Notice: Subject to any disclaimer, the term of this patent is extended or adjusted under 35 U.S.C. 154(b) by 43 days.

(21) Appl. No.: 10/911,896

(22) Filed: Aug. 5, 2004

(65) Prior Publication Data

US 2006/0027773 A1    Feb. 9, 2006

(51) Int. Cl.
*F15B 13/00*   (2006.01)

(52) U.S. Cl. .............................. 251/129.15; 123/90.11; 137/625.65

(58) Field of Classification Search ........... 251/129.15; 123/90.11; 137/625.65
See application file for complete search history.

(56) References Cited

U.S. PATENT DOCUMENTS

| 3,788,597 | A | 1/1974 | Ichioka |
| 4,127,835 | A | 11/1978 | Knutson |
| 4,267,897 | A | 5/1981 | Takeshima |
| 4,525,695 | A | 6/1985 | Sheng et al. |
| 5,004,440 | A * | 4/1991 | Suzuki ................... 137/625.65 |
| 5,249,603 | A * | 10/1993 | Byers, Jr. .............. 137/625.65 |
| 5,252,939 | A | 10/1993 | Riefler et al. |
| 6,029,704 | A * | 2/2000 | Kuroda et al. ......... 137/625.65 |
| 6,313,726 | B1 | 11/2001 | Golovatai-Schmidt et al. |
| 6,435,472 | B1 * | 8/2002 | Najmolhoda et al. ......... 251/50 |
| 6,612,544 | B1 * | 9/2003 | Sakata et al. .......... 251/129.15 |
| 6,640,834 | B1 | 11/2003 | Hamkins et al. |
| 6,659,121 | B1 * | 12/2003 | Takahashi et al. .......... 137/238 |

* cited by examiner

*Primary Examiner*—J. Casimer Jacyna
(74) *Attorney, Agent, or Firm*—George E. Haas; Quarles & Brady LLP

(57) ABSTRACT

A solenoid operated valve has a valve body with a plurality of ports and a spool slidable within the valve body to interconnect the ports in different combinations. An actuator drives the spool into several operating positions. The actuator has a solenoid assembly with an aperture within which first and second tubular pole pieces are received. An armature is able to slide within the two pole pieces and a push member projects from the armature abutting the spool. The push member is secured to a rolling bearing which has a plurality of rolling elements that roll against the pole pieces to reduce resistance to movement of the armature.

31 Claims, 2 Drawing Sheets

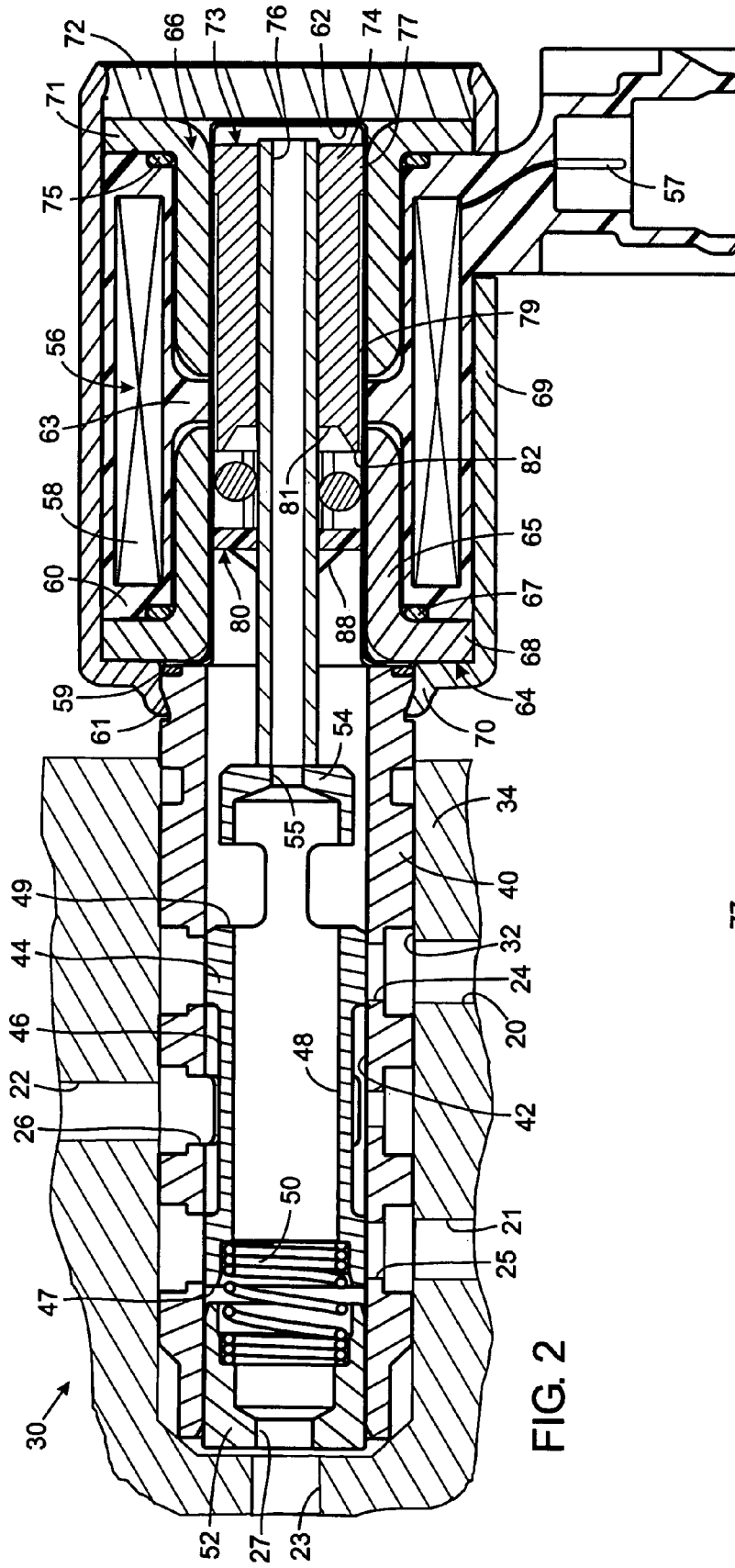

ELECTROHYDRAULIC VALVE HAVING AN ARMATURE WITH A ROLLING BEARING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to electrically operated spool valves for controlling flow of a fluid, and more particularly to such electrohydraulic valves that operate a mechanism which alters timing of an internal combustion engine by varying the phase relationship between a cam shaft and a crankshaft.

2. Description of the Related Art

Internal combustion engines used in motor vehicles have a plurality of cylinders containing pistons that are connected to a crankshaft. Each cylinder has two or more valves that control the flow of a fuel mixture into the cylinder and the flow of post-combustion gases therefrom. Traditionally the cylinder valves were controlled by a camshaft which was mechanically coupled to rotate with the crankshaft. Gears, chains or belts have been used to couple the crankshaft to the camshaft so that the two rotate in unison. It is important that the valves open and close at the proper times during the combustion cycle within each cylinder. Heretofore, that timing relationship was fixed by the mechanical coupling between the crankshaft and the camshaft.

The setting of the camshaft timing often was a compromise that produced the best overall operation at all engine operating speeds. However, it has been recognized that more optimum engine performance could be obtained if the valve timing varies as a function of engine speed, engine load and other factors. With the advent of computerized engine control, it became possible to determine the optimum engine valve timing based on the operating conditions occurring at any given point and time.

With reference to FIG. 1, the engine computer 11 determines the optimum valve timing and issues a signal to an electrohydraulic valve 10 which controls the flow of pressurized engine oil from a pump to a cam phase adjustment mechanism 12. The cam phase adjustment mechanism 12 couples the camshaft 14 to a pulley 16, gear or other device that is driven by the engine crankshaft. The phase relationship between the rotating pulley 16 and the camshaft 14 can be dynamically varied by selectively applying pressurized engine oil to one of two ports 18 or 19 of the adjustment mechanism. For example, application of engine oil from the pump to the first port 18 and exhausting engine oil from the second port 19 to the tank advances the valve timing. Whereas connecting the second port 19 of the adjustment mechanism 12 to the pump and coupling the first port 18 to the tank retards the valve timing. The hydraulic valve 10 is a proportional type valve which allows the amount that the cylinder valves are advanced or retarded to be varied proportionally by metering the flow of engine oil to and from the adjustment mechanism 12. A sensor 15 provides an electrical signal indicating the angular phase of the camshaft.

Key to the operation of the variable cylinder valve timing is the proper control of engine oil flow to the two port 18 and 19 and the accurate metering of that flow. Thus the control valve 10 becomes a critical element in the proper operation of the engine.

SUMMARY OF THE INVENTION

An electrohydraulic valve comprises a body with a longitudinal bore into which an inlet port, an outlet port, a first workport, and a second workport communicate. A spool is slidably received within the bore and has passages therein that selectively connect the inlet port and the outlet port to the first workport and the second workport in different positions of the spool in the bore.

The spool is moved within the bore by an electrically operated actuator, that includes a solenoid coil assembly with an coil aperture therein. An armature is slidably located in the coil aperture. A push member is attached to the armature and abuts the spool. A cage is secured to at least one of the armature and the push member and has an outer surface with a plurality of slots. A plurality of elements, such as spheres for example, are rollably received in the plurality of slots and contact with the actuator aperture. The cage and the plurality of elements form a rolling bearing that reduces resistance of the armature to motion.

In a preferred embodiment of the electrohydraulic valve, the actuator has a first pole piece with a tubular interior section that extends into one end of the coil aperture. A second pole piece has a tubular section that extends into another end of the coil aperture. The armature slides within the tubular interior section of the first pole piece and the tubular section second pole piece in response to a magnetic field produced by the solenoid coil. A housing, which encloses the first and second pole pieces and the coil, is secured to the valve body by crimped connection.

BRIEF DESCRIPTION OF THE DRAWINGS

FIG. 2 is a longitudinal cross section view through an electrohydraulic valve according the present invention;

FIG. 3 is an isometric view of an actuator plunger in the electrohydraulic valve;

FIG. 4 is an isometric view illustrating an armature of the actuator plunger ring staked to a push member.

DETAILED DESCRIPTION OF THE INVENTION

Figure 1:
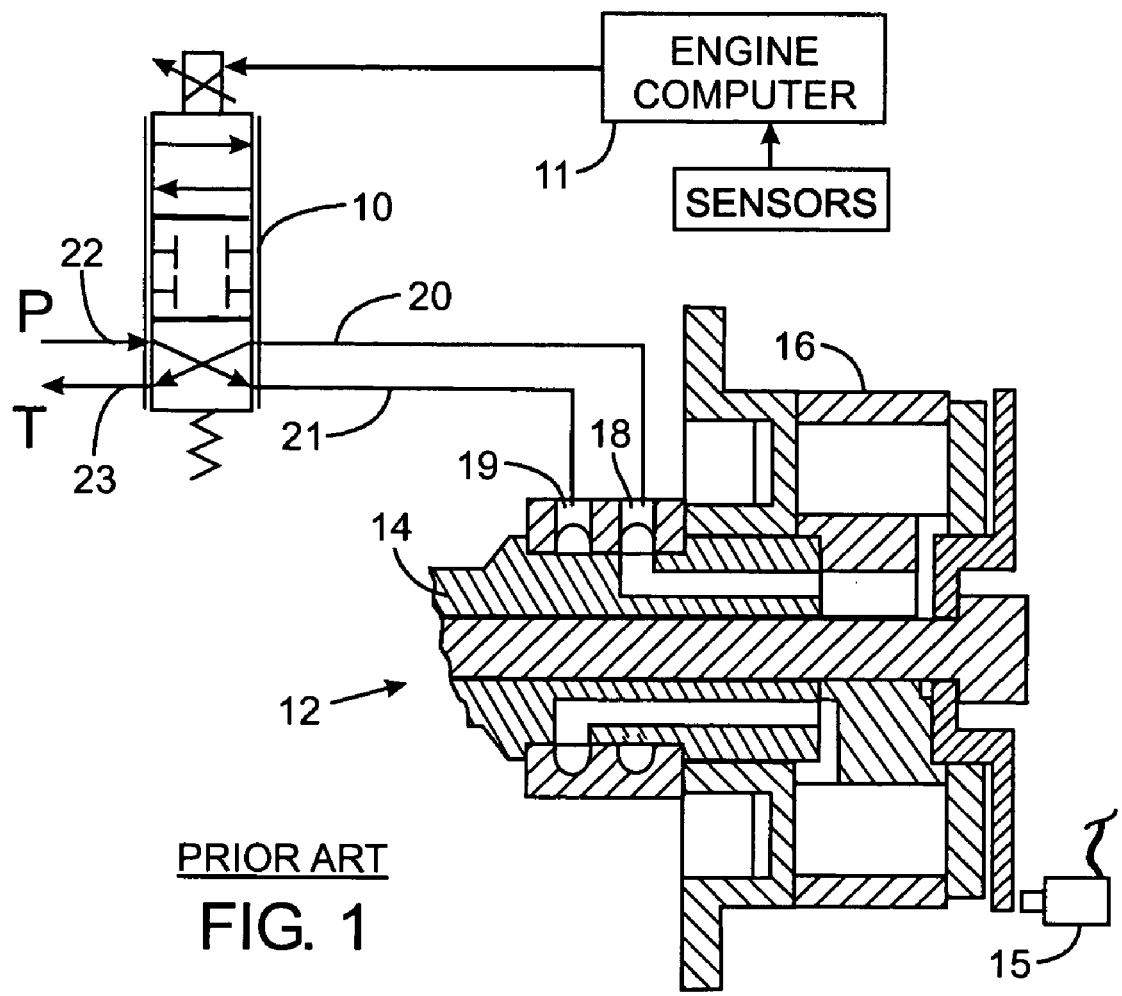
FIG. 1 is a schematic diagram of a variable camshaft adjustment system for an internal combustion engine in which the adjustment system is operated by an electrohydraulic valve.

Referring to FIG. 2, an electrohydraulic control valve 30 is illustrated inserted into an aperture 32 in a manifold 34 of a conventional variable cam phase adjustment mechanism. The ports 18 and 19 of the cam phasing mechanism 12 shown in FIG. 1 are connected respectively to two passages 20 and 21 that extend through the manifold 34 and those passages open into the aperture 32. A supply passage 22 extends between the engine's oil pump and the manifold aperture 32, while a return passage 23 at the interior end of the aperture leads to the oil pan (or tank) of the engine.

The electrohydraulic valve 30 has a tubular valve body 40 with a longitudinal bore 42 and transverse openings which provide ports between the manifold passages and the longitudinal bore. Specifically, a first workport 24 connects to the first passage 20 and a second workport 25 communicates with the second passage 21. An inlet port 26 in the valve body is associated with the supply passage 22 and an outlet port 27 opens into the return passage 23.

A spool 44 is slidably received within the bore 42 of the valve body 40 and has an exterior annular notch 46 which, in selective positions of the spool, provides a fluid path between the inlet port 26 and one of the two workports 24 and 25 and thus between the associated manifold passages. In a middle, or intermediate, position of the spool travel, the inlet port 26 is closed from both workports 24 and 25. A central aperture 48 extends between the opposite ends 47 and 49 of the spool 44. A head 54 projects from the outward end 49 of the valve spool 44 and has an aperture 55 there through. A spring 50 biases the spool 44 away from a nose piece 52 of the valve body 40.

The valve 30 further includes an electromagnetic actuator 56 comprising a solenoid coil 58 in a non-magnetic bobbin 60, preferably made of plastic molded around the coil to form a solenoid assembly. The solenoid coil 58 is driven by a pulse width modulated (PWM) signal having a duty cycle that is varied in a conventional manner to position the spool 44 in the valve body 40. The PWM signal is applied to the electromagnetic actuator 56 via a connector 57 formed in a lateral projection of the bobbin 60 and connected by wires to the solenoid coil 58.

The electromagnetic actuator 56 further includes two magnetically conductive pole pieces 64 and 66. The first pole piece 64 has a cylindrical tubular interior section 65 that extends into one end of the bobbin 60. An O-ring 67 provides a hermetic seal between the first pole piece 64 and the bobbin 60. The first pole piece 64 has a flange 68 which projects outwardly from the interior section 65 across the outer end of the valve body 40. The second pole piece 66 has a second tubular section that extending into the opposite end of the bobbin 60 and has an interior end that is spaced from the first pole piece 64. An annular rib 63 of the bobbin magnetically separates the first and second pole pieces 64 and 66. The outer end of the second pole piece 66 has an outwardly projecting flange 71 and another O-ring 75 provides a hermetic seal between this flange and the bobbin 60.

A liner tube 62, preferably of stainless steel, extends through the first and second pole pieces 64 and 66. The liner tube 62 provides a magnetic barrier between the pole pieces as well as acting as a guide for a sliding plunger 73. An open end of the liner tube 62 faces the valve body 40 and a closed end is adjacent the outwardly projecting flange 71 of the second pole piece 66.

The electromagnetic actuator 56 is enclosed by a metal outer housing 69 that extends around the first and second pole pieces 64 and 66 and the bobbin 60. The open end of the outer housing 69, adjacent the second pole piece 66, is crimped to a disk 72 to close that opening. At the opposite end, the outer housing 69 has an inwardly projecting flange 70 which is crimped into a depression, such as an annular groove 61, in the exterior surface of the valve body 40, thereby securing those components together. An O-ring 59 provides a fluid tight seal between a flange on the liner tube 62 and the valve body 40. Thus the closed liner tube 62 provides a sealed inner cavity within the electromagnetic actuator 56 that contains the fluid passing through the valve body 40.

With reference to FIGS. 2 and 3, the plunger 73 of the electromagnetic actuator 56 is slidably located within the liner tube 62 and includes an armature 74 of ferromagnetic material. A region 77 at the outer end of the armature 74 has a larger diameter than the remainder of the armature so that only a relatively small surface area engages the inside diameter of the liner tube 62 and a gap 79 exists between most of the armature and the liner tube. By minimizing this surface area of engagement, resistance to the armature 74 sliding in the liner tube 62 is minimized. However, enlarging that gap 79 increases the magnetic impedance which tends to diminish the magnetic force acting on the armature. In response, the inner end of the armature 74 has a tapered recess 81, which forms a knife edge 82 around the outer perimeter of that end. The magnetic flux flowing between the armature and the first pole piece 64 is concentrated through the region of the knife edge 82. Concentrating the magnetic flux in this manner, counteracts the adverse effect of the gap 79 on the electromagnetic performance of the actuator 56.

The armature 74 has a longitudinal aperture in which a tubular push member 76 is received. Both ends of the armature are "ring staked" to the push member 76. As shown in FIG. 4, ring staking involves forming indentations of the armature end surfaces at locations 85 which pushes that armature material around the aperture tightly against the push member 76. Referring again to FIGS. 2 and 3, the push member 76 projects outward from the open end of the liner tube 62 and abuts the head 54 of the valve spool 44.

Figure 5:
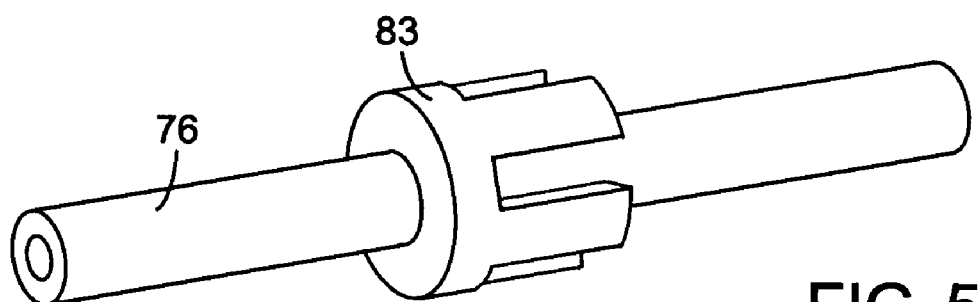
FIG. 5 illustrates an alternative embodiment for a bearing cage and a push member of the actuator plunger.

The plunger 73 further includes a rolling bearing 80 mounted on the push member 76 between the armature 74 and the valve spool head 54. An axial force is applied to the plunger 73 by the magnetic flux at the end of the first pole piece 64 and rolling bearing 80 at this location prevents binding of the armature due to that axial force. The rolling bearing 80 comprises a plastic cage 83 with five longitudinal slots 84 equidistantly spaced around its outer surface. A separate chromium plated sphere 86 is located in each slot 84. Each sphere 86 projects from the respective slot into contact with the liner tube 62 and the push member 76 and is able to roll within the respective slot 84. Other forms of rollable elements, such as cylinders, may be used in place of the spheres 86. The cage 83 is held in place on the push member 76 by a retaining ring 88. Alternatively the cage 83 and the push member 76 can be fabricated as a single plastic part 90 as shown in FIG. 5.

Referring specifically to FIG. 2, the valve 30 is fabricated by placing the solenoid coil 58 in a mold into which molten plastic for the bobbin 60 is injected to encapsulate the solenoid coil. After that molded assembly has hardened, the first pole piece 64 along with the inner O-ring 67 and the second pole piece 66 with the outer O-ring 75 are placed into the bobbin. The assembly then is inserted into the outer housing 69. Next the disk 72 is positioned in the open end of the outer housing 69 and crimped in place. The liner tube 62 is inserted into the other end of the first pole piece 64 and the plunger 73 is slid into the liner tube 62, thereby completing assembly of the electromagnetic actuator 56.

The valve components then are assembled into the valve body 40 and the nose piece 52 is pressed into the valve body to provide a spring preload. The electromagnetic actuator 56 is placed on the end of the valve body 40 with O-ring 59 between the valve body 40 and the flange of the liner tube 62 to provide a hydraulic seal. Then, the flange 70 is crimped into an annular groove 61 in the valve body 40 securing the components together.

References herein to directional relationships and movement, such as upper and lower or up and down, refer to the relationship and movement of the components in the orientation illustrated in the drawings, which may not be the orientation of the components as attached to machinery.

When the electrohydraulic valve 30 is not activated by electric current applied to the solenoid coil 58, the spring 50 forces the spool 44 into a position at which the annular notch 46 provides a fluid path between the inlet port 26 and the first workport 24 leading to the first manifold passage 20. In this de-energized state, the inner end of the spool 44 is positioned to the right which opens a path between the outlet port 27 and the second workport 25 communicating with the second manifold passage 21. Pressurized engine oil now is fed through the first manifold passage 20 to port 18 of the cam phasing mechanism 12 and oil is drained from that mechanism's second port 19 through the second manifold passage 21 to the oil pan, thereby advancing the valve timing.

From the de-energized state, application of a relatively small magnitude electric current to the solenoid coil 58 produces movement of the armature 74 and push member 76 toward the valve body 40. This motion also moves the spool 44 thereby reducing the size of the fluid paths described immediately above. This decreases the flow of engine oil to the cam phasing mechanism 12 which reduces the rate at which the valve timing is being changed.

Application of a greater magnitude electric current to the solenoid coil 58 eventually moves the spool 44 leftward in FIG. 2 into an intermediate position closing the previous path between the second workport 25 and the outlet port 27, via the spool's central aperture 48. The annular spool notch 46 now opens only into the inlet port 26 and both the first and second workports 24 and 25 are closed. This stops movement of the cam phasing mechanism 12 fixing the relationship between the crankshaft and the camshaft on the engine. Alternatively, the annular spool notch 46 in the valve body 40 can be configured so that in this intermediate position the first and second workports 24 and 25 both communicate with the inlet port 26. This applies equal pressure to both the first workport 24 and the second workport 25.

Referring still to FIG. 2, applying a still greater magnitude electric current to the solenoid coil 58 eventually moves the spool 44 farther to the left into a position where the first workport 24 communicates with the central aperture 48 through the spool 44. This opens a fluid path between the first workport 24 and the outlet port 27. In this position the annular notch 46 of the spool provides a path between the inlet port 26 and only the second workport 25 that leads to the second port 19 of the cam phasing mechanism 12. This applies pressurized engine oil to the mechanism's second port 19 and drains the oil from the mechanism's first port 18 to the oil pan, thereby retarding the phase relationship between the cam and crank shafts. The size of the openings between these passages is varied by controlling the magnitude of the electric current applied to the solenoid coil 58 to meter the flow of engine oil and thus control the rate at which valve timing changes.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An electrohydraulic valve comprising:
   a valve body with a bore and having an inlet port, an outlet port, a first workport, and a second workport in communication with the bore;
   a spool slidably received within the bore of the valve body and having passages therein to selectively connect the inlet port and the outlet port to the first workport and the second workport in different positions of the spool in the bore; and
   an actuator having a solenoid coil assembly with a coil aperture formed therein, an armature slidably received in the coil aperture, and a push member projecting from the armature into engagement with the spool, the actuator further includes a cage secured to at least one of the armature and the push member with an outer surface in which a plurality of slots extend, and a plurality of rollable elements received in the plurality of slots and contact with the actuator aperture.

2. The electrohydraulic valve as recited in claim 1 wherein the cage has an aperture through which the push member extends.

3. The electrohydraulic valve as recited in claim 2 wherein the cage is secured to the push member by a retaining ring.

4. The electrohydraulic valve as recited in claim 1 wherein the cage and push are formed as a single piece.

5. The electrohydraulic valve as recited in claim 1 wherein the cage is formed of non-magnetic material.

6. The electrohydraulic valve as in claim 1 wherein the armature has an aperture into which the push member is received and the armature is staked to the push member.

7. The electrohydraulic valve as recited in claim 1 wherein the plurality of rollable elements are spheres.

8. The electrohydraulic valve as recited in claim 1 wherein the armature has a region at one end with a reduced thickness to concentrate, in that region, magnetic flux produced by the coil.

9. The electrohydraulic valve as recited in claim 1 wherein the actuator further comprises:
   a first pole piece that extends into one end of the coil aperture and having an outwardly extending first flange that is outside the coil aperture; and
   a second pole piece extending into another end of the coil aperture and spaced from the first pole piece, the second pole piece having an outwardly extending second flange outside the coil aperture;
   wherein the armature moves within the first pole piece and the second pole piece in response to a magnetic field produced by the solenoid coil.

10. The electrohydraulic valve as recited in claim 9 wherein the armature bridges a space between the first pole piece and the second pole piece, and has one end adjacent the first pole piece which one end has a region with a reduced thickness to concentrate, in that region, magnetic flux produced by the coil.

11. The electrohydraulic valve as recited in claim 9 wherein the actuator further comprises a tube of non-magnetic material located within the first pole piece and the second pole piece, with the armature and a cage moveably received in the tube with the plurality of rollable elements engaging the tube.

12. The electrohydraulic valve as recited in claim 9 wherein the actuator further comprises an outer housing, made of a magnetically conductive metal, extending around the solenoid coil assembly and crimped to the valve body, the outer housing engaging the first flange of the first pole piece and the second flange of the second pole piece.

13. The electrohydraulic valve as recited in claim 1 wherein the actuator further comprises an outer housing extending around the solenoid coil assembly and crimped to the valve body.

14. The electrohydraulic valve as recited in claim 1 wherein:
the outlet port is at one end of the bore in the valve body, and the first workport, the second workport and the inlet port open transversely into the bore;
the spool has two ends with an aperture extending there between and has an notch in an exterior surface; and
a spring which biases the spool into engagement with the push member.

15. The electrohydraulic valve as recited in claim 14 wherein in response to forces from the spring and the armature, the spool moves into a first position where the second workport is in fluid communication with the outlet port and the first workport is in fluid communication via the notch with the inlet port, and a second position where the inlet port is in fluid communication via the notch with the second workport and the aperture provides a fluid path between the first workport and the outlet port.

16. The electrohydraulic valve as recited in claim 15 further comprising the spool having an intermediate position between the first position and the second position in which the notch provides an interconnection of the first workport, the second workport and the inlet port.

17. The electrohydraulic valve as recited in claim 14 wherein the spool has an intermediate position between the first position and the second position in which the first workport and the second workport are disconnected from the inlet port and the outlet port.

18. An electrohydraulic valve comprising:
a valve body having a bore there through forming an outlet port at one end of the valve body, and having with a first port, a second port and an inlet port in communication with the bore;
a spool slidably received within the bore of the valve body and having an aperture extending from an end of the spool to a point proximate an opposite end of the spool, the spool including an notch in an exterior surface;
a spring which biases the spool away from the one end of the valve body; and
an actuator having a solenoid coil assembly with an coil aperture therein, a first pole piece with a tubular section that extends into one end of the coil aperture, and a second pole piece having a tubular section extending into another end of the coil aperture and spaced from the first pole piece, the actuator further including a plunger comprising an armature slidable within the tubular interior section of the first pole piece and the tubular section of the second pole piece, a push member projecting from the armature into engagement with the spool, and a bearing that has a plurality of rollable elements which guide movement of the armature within at least one of the first and second pole pieces.

19. The electrohydraulic valve as recited in claim 18 wherein the bearing comprises a cage secured to at least one of the body and the push member, the cage having an outer surface with plurality of slots, and the plurality of rollable elements comprises spheres received in the plurality of slots.

20. The electrohydraulic valve as recited in claim 19 wherein the cage has an aperture through which the push member extends, and the cage is secured to the push member by a retaining ring.

21. The electrohydraulic valve as recited in claim 18 wherein the armature has an aperture into which the push member is received and the armature is staked to the push member.

22. The electrohydraulic valve as recited in claim 18 wherein in response to forces from the spring and the armature, the spool moves into a first position where the second port is in fluid communication with the outlet port and the first port is in fluid communication via the notch with the inlet port, and into a second position where the inlet port is in fluid communication via the notch with the second port and the aperture provides a fluid path between the first port and the outlet port.

23. The electrohydraulic valve as recited in claim 22 wherein the spool has an intermediate position between the first position and the second position in which the notch provides an interconnection of the first port, the second port and the inlet port.

24. The electrohydraulic valve as recited in claim 22 wherein the spool has an intermediate position between the first position and the second position in which the first port and the second port are disconnected from the inlet port and the outlet port.

25. The electrohydraulic valve as recited in claim 18 wherein the actuator further comprises a non-magnetic tube within the first and second pole pieces and having a portion that extends between the first pole piece and the valve body, and wherein the armature and rolling bearing are within the tube.

26. The electrohydraulic valve as recited in claim 18 wherein the actuator further comprises an outer housing extending around the solenoid coil assembly and crimped to the valve body.

27. The electrohydraulic valve as recited in claim 18 wherein the actuator further comprises an outer housing, made of a magnetically conductive metal, extending around the solenoid coil assembly and crimped to the valve body, the outer housing engaging the first flange of the first pole piece and the second flange of the second pole piece.

28. The electrohydraulic valve as recited in claim 18 wherein the armature has a given end facing the valve body, wherein the given end has a reduced thickness to concentrate magnetic flux produced by the coil.

29. An electrohydraulic valve comprising:
a valve body with a bore and having an inlet port, an outlet port, a first workport, and a second workport in communication with the bore;
a spool slidably received within the bore of the valve body and having passages therein to selectively connect the inlet port and the outlet port to the first workport and the second workport in different positions of the spool in the bore; and
an actuator having a solenoid coil assembly with a coil aperture formed therein, an armature slidably received in the coil aperture, wherein the armature has a region at one end with a reduced thickness to concentrate, in that region, magnetic flux produced by the coil, and the actuator further includes a push member projecting from the armature into engagement with the spool and a bearing secured to at least one of the armature and the push member.

30. The electrohydraulic valve as recited in claim 29 wherein the bearing comprises a cage with an outer surface in which a plurality of slots extend; and a plurality of rollable elements received in the plurality of slots and contact with the actuator aperture.

31. The electrohydraulic valve as recited in claim 30 wherein the cage is attached to the push member.

* * * * *